(12) United States Patent
Henriksson et al.

(10) Patent No.: US 10,518,405 B2
(45) Date of Patent: Dec. 31, 2019

(54) INDUSTRIAL ROBOT SYSTEM COMPRISING A DUAL ARM ROBOT

(71) Applicant: ABB Schweiz AG, Baden (CH)

(72) Inventors: Adam Henriksson, Västerås (SE); Jonatan Blom, Sundbyberg (SE); Susanne Timsjö, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/313,665

(22) PCT Filed: Jun. 29, 2016

(86) PCT No.: PCT/EP2016/065108
§ 371 (c)(1),
(2) Date: Dec. 27, 2018

(87) PCT Pub. No.: WO2018/001472
PCT Pub. Date: Jan. 4, 2018

(65) Prior Publication Data
US 2019/0337148 A1    Nov. 7, 2019

(51) Int. Cl.
*B25J 13/00* (2006.01)
*B25J 9/00* (2006.01)
(Continued)

(52) U.S. Cl.
CPC ............ *B25J 9/0087* (2013.01); *B25J 13/06* (2013.01); *B25J 13/088* (2013.01)

(58) Field of Classification Search
CPC .............. B25J 9/0087; B25J 9/1682; G09G 2340/0492; G05B 19/423;
(Continued)

(56) References Cited

U.S. PATENT DOCUMENTS 795,738 A    7/1905  Stevenson et al.
920,434 A    5/1909  Coleman
(Continued)

FOREIGN PATENT DOCUMENTS

DE    102004060484 A1    6/2006
DE    102007024157 A1    7/2009
(Continued)

OTHER PUBLICATIONS

International Search Report and Written Opinion of the International Searching Authority Application No. PCT/EP2016/065108 Completed: Mar. 30, 2017; dated Apr. 10, 2017 12 pages.

*Primary Examiner* — Dalena Tran
(74) *Attorney, Agent, or Firm* — Whitmyer IP Group LLC

(57) ABSTRACT

An industrial robot system including a dual arm robot having two arms independently movable in relation to each other, and a hand-held control device for controlling the robot and provided with a visual display unit for displaying information about the arms. The control device is provided with a measuring device for measuring the orientation of the control device, and the control device is configured to display information about one of the arms in a first area on the display unit and to display information about the other arm in a second area on the display unit, and to change the positions of the first and second areas in dependence on the orientation of the control device in relation to the robot so that the positions of the first and second area on the display unit reflects the orientation of the control device in relation to the positions of the arms.

20 Claims, 3 Drawing Sheets

(51) Int. Cl.
*B25J 13/06* (2006.01)
*B25J 13/08* (2006.01)

(58) Field of Classification Search
CPC ........... G05B 2219/39466; G05B 2219/40116; Y10S 901/01; Y10S 901/31; Y10S 901/46
USPC .............................. 700/245, 264; 901/1, 46
See application file for complete search history.

(56) References Cited

U.S. PATENT DOCUMENTS

| | | |
|---|---|---|
| 3,890,552 A | 6/1975 | Devol et al. |
| 6,088,628 A | 7/2000 | Watanabe et al. |
| 2005/0060064 A1 | 3/2005 | Valen et al. |
| 2009/0142163 A1* | 6/2009 | Genetti ............. H01L 21/67196 414/217 |
| 2009/0204261 A1 | 8/2009 | Strand et al. |
| 2012/0224311 A1* | 9/2012 | Sutherland ............. B25J 9/0084 361/679.01 |
| 2014/0365011 A1* | 12/2014 | Hosek ................... H01L 21/681 700/259 |
| 2015/0321351 A1 | 11/2015 | Kapoor et al. |

FOREIGN PATENT DOCUMENTS

| | | |
|---|---|---|
| DE | 102012021422 A1 | 4/2014 |
| EP | 1435280 A2 | 7/2004 |
| EP | 2392435 A2 | 12/2011 |
| WO | 2011153569 A1 | 12/2011 |

\* cited by examiner

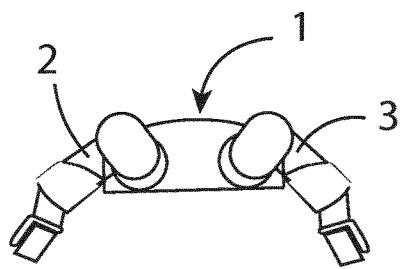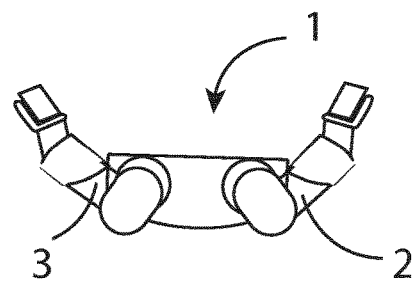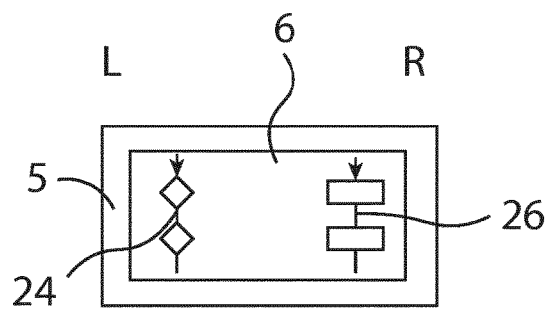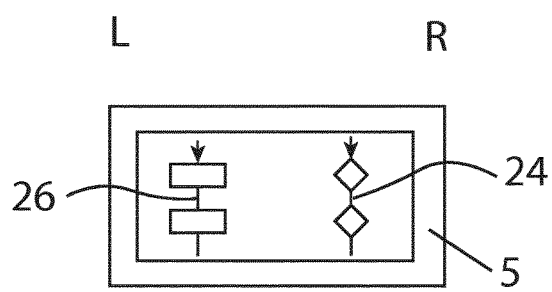
Fig. 2
Fig. 3
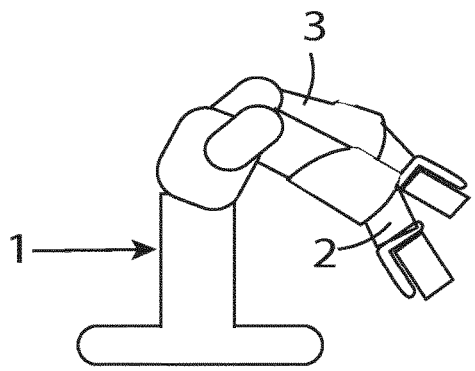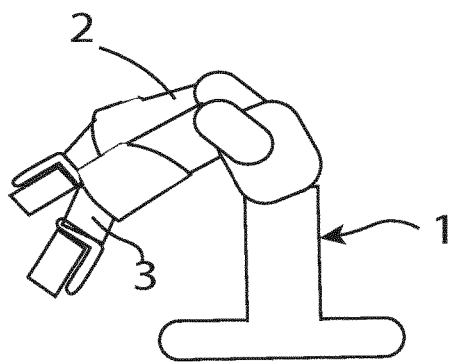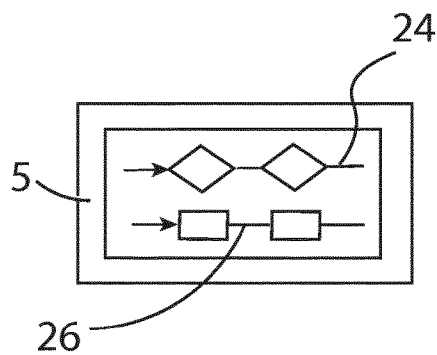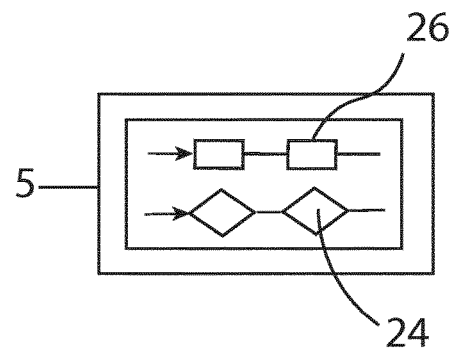
Fig. 4
Fig. 5

INDUSTRIAL ROBOT SYSTEM COMPRISING A DUAL ARM ROBOT

TECHNICAL FIELD

The present invention relates to an industrial robot system comprising a dual arm robot having two arms independently movable in relation to each other, and a hand-held control device for controlling the arms, provided with a visual display unit and configured to display information about the arms on the display unit.

BACKGROUND

In a typical robot factory, the integrator and operator can access the functionality of a robot through a hand-held control device provided with an interface allowing a user to access the functionality of the robot, such as programming and manual operation of the robot. The hand-held control device enables the user to move around the robot throughout the integration and operation processes. Information on the current state of the robot as well as its workflow is displayed on the display unit of the control device. This type of interface works well for a one-armed robot, but displaying information on a more complex system may cause confusion for the operator.

For instance, a dual-arm robot is technically two robots that are individually controlled and programmed through a single user interface. The dual arm robot has a body, and two arms movably attached to the body on opposite sides of the body. An arm can be moved independently of the other arm. Since the arms can do different tasks, both arms need individual workflows often referred to as swim lanes. Sometimes, it can be difficult for the user to determine which swim lane belongs to which arm. Furthermore, the relationship between the arms and the swim lanes can also change as the user moves around the robots.

SUMMARY

It is an object of the present invention to at least partly overcome the above problems, and to facilitate controlling and programming of a dual arm robot.

This object is achieved by a robot system according to the invention.

The industrial robot system comprises a dual arm robot having two arms independently movable in relation to each other, and a hand-held control device for controlling the arms. The control device is provided with a visual display unit for displaying information about the arms, and a first measuring device for measuring the orientation of the control device. The control device is configured to display information about one of the arms in a first area on the display unit and to display information about the other arm in a second area on the display unit, and to change the positions of the first and second areas in dependence on the orientation of the control device in relation to the robot so that the positions of the first and second area on the display unit reflect the orientation of the control device in relation to the positions of the arms.

The invention enables the control device to display information about the arms correspondingly to the orientation of the control device in relation to the robot, and accordingly to show information about the arms more intuitively. The invention improves the efficiency of the programming and manual operation of the robot due to the fact that the robot operators do not need to spend time interpreting the orientation of the robot. The robot system becomes easier to use since the robot operators feel that the interface supports their task. Further, the invention increases the safety of the robot system since the operators can make less mistakes due to misunderstanding of the orientation of the arms.

According to the invention, the control device is provided with a measuring device for measuring its orientation. Thus, the physical orientation of the control device in relation to the robot, and thus the orientation of the user in relation to the robot, can be determined. The orientation of the control device in relation to the robot can, for example, be determined by carrying out a homing procedure, by using a camera, or by using a second measuring unit located inside the robot for measuring the orientation of the robot. When knowing the orientation of the control device in relation to the robot, the control device can present information about the arms in a physically correct orientation in relation to the robot.

With the term "the positions of the first and second area on the display unit reflects the orientation of the control device in relation to the positions of the arms" is, for example, meant that information on the left arm is presented on an area to the left of an area with information on the right arm on the display device and vice versa.

According to an embodiment of the invention, the control device is configured to determine when it is in front of the robot and when it is behind the robot based on the orientation of the control device in relation to the robot, and to change the positions of the first and second areas in dependence on whether the control device is in front of the robot or behind the robot. The control device is configured to change the positions of the first and second area so that information on the arm on a left side of the robot with respect to the control device is presented to the left of the information on the arm on the right side of the robot regardless of whether the control device is in front of the robot or behind the robot. Preferably, the control device is configured to change the positions of the first and second area so that information on the arm on the left side of the robot is presented on a left side of the display unit and information on the arm on the right side of the robot is presented on a right side of the display unit. Thus, information for an arm on a left side of the robot, as seen from the user's point of view, is always presented to the left of the information on an arm on the right side of the robot, regardless of whether the control device is in front of the robot or behind the robot. The positions of the information on the arms on the mobile device will automatically correspond to the positions of the arms of the robot that is standing in front of the user. Thus, the robot operator is not required to interpret a "left" or "right" arm while standing in front and behind the robot. This embodiment avoids that what looks correct standing in front of the robot becomes mirrored standing behind the robot. This will reduce the risk that the user confuses the information on the arms, and accordingly operates or programs the arms incorrectly.

According to an embodiment of the invention, the control device is configured to calculate a difference between the orientations of the control device and the orientation of the robot, and to determine whether the control device is in front of the robot or behind the robot based on the calculated difference between the orientations. Suitably, the control device is configured to determine whether the control device is in front of the robot or behind the robot based on the calculated difference between the orientations and defined intervals for the difference between the orientations.

According to an embodiment of the invention, the control device is configured to determine when it is on a first side of the robot and when it is on a second side of the robot based on the orientation of the control device in relation to the robot, and to change the positions of the first and second area in dependence on whether the control device is determined to be in front of the robot, behind the robot, on the first side of the robot, or on the second side of the robot. This will further reduce the risk that the user confuses the information on the arms, and accordingly operates or programs the arms incorrectly.

According to an embodiment of the invention, the first measuring device comprises a magnetometer. Magnetometers are widely used for measuring the Earth's magnetic field and in geophysical surveys to detect magnetic anomalies of various types. A magnetometer is a small, inexpensive, and often battery-powered sensor used to measure the direction of the magnetic field at a point in space. Magnetometers work indoors and require no comprehensive installations, and are thus suitable to use in this application.

According to an embodiment of the invention, the first measuring device comprises an accelerometer, and the control device is configured to determine the orientation of the control device based on measurements from the magnetometer and the accelerometer. Measuring data from the accelerometer can be used to compensate for variations in the angle of the control device in relation to the vertical line. This embodiment enables the control device to correctly determine its orientation, and accordingly to display the information in correct relative positions, independent of the angle of the control device with respect to the vertical line, i.e. regardless of whether the control device is kept tilted or is horizontal.

The control device is configured to automatically present information related to the arms in a physically correct orientation in relation to the robot based on the current physical orientation of the control device in relation to the current physical orientation of the robot. In order to determine the current orientation of the control device in relation to the robot, it is necessary to know the physical orientation of the robot in relation to the control device. This information can be provided in several ways.

According to an embodiment of the invention, the robot is provided with a second measuring device for measuring the orientation of the robot, and the control device is configured to change the positions of the first and second areas in dependence on the difference between the orientation of the control device and the orientation of the robot. The first mentioned measuring device measures the orientation of the control device and the second measuring device measures the orientation of the robot. Thus, it is easy to determine the orientation of the control device in relation to the robot. This embodiments avoids the need of carrying out a homing procedure between the robot and the control device.

According to an embodiment of the invention, the first measuring device is configured to measure the orientation of the control device in relation to the earth magnetic field, and the second measuring device is configured to measure the orientation of the robot in relation to the earth magnetic field, and the control device is configured to receive measuring data from the second measuring device, to calculate the difference between the orientation of the control device and the orientation of the robot, and to change the positions of the first and the second areas in dependence on the difference. A simple compass, such as a magnetometer, can be used.

According to an embodiment of the invention, the second measuring device comprises a magnetometer. It is proposed that the robot is provided with a magnetometer, which output is compared to the orientation of the control device. Based on a comparison of the measured orientations from the first and second measuring devices, the control device can display the information about the arms in positions that correspond to the physical orientation of the robot. Magnetometers are small, inexpensive, and require no comprehensive installations, and are thus suitable to integrate in the robot.

According to an embodiment of the invention, the second measuring device comprises an accelerometer, and the robot is configured to determine the orientation of the robot based on measurements from the magnetometer and the accelerometer. By using an accelerometer it is possible to compensate for variations in the mounting of the robot, for example, if the body of the robot is not aligned with the vertical line.

According to an embodiment of the invention, the robot has a body, the arms are movably attached to the body, and said second measuring device is mounted in the body. It is convenient to mount the second measuring device in the body of the robot.

According to an embodiment of the invention, the information about the arms comprises swim lanes representing workflows for each of the arms. The first area comprises a swim lane for the first arm, and the second area comprises a swim lane for the second arm of the robot. A swim lane is a type of flowchart that differs from other flowcharts in that the processes are grouped visually by placing them in lanes, such as one lane for each arm.

According to an embodiment of the invention, the control device is configured to determine when it is in front of the robot and when it is behind the robot based on the orientation of the control device in relation to the robot, and to switch the positions of the swim lanes in dependence on whether the control device is in front of the robot or behind the robot. When the user moves the control device around the robot the positions of the swim lanes are switched, so that the right swim lane always corresponds to the right arm and the left swim lane always corresponds to the left arm, as seen from the user's perspective. Thus, mistakes due to the operator misunderstanding which swim lane belongs to which arm are avoided.

According to an embodiment of the invention, the control device is a tablet computer. Suitably, the tablet computer is provided with an Inertial Measuring Unit (IMU). An inertial measurement unit is an electronic device that measures a body's specific force, angular rate, and sometimes the magnetic field surrounding the body, using a combination of accelerometers, gyroscopes, and magnetometers. There exist commercially available tablet computers having an integrated IMU. Using a commercially available tablet computer can save costs.

BRIEF DESCRIPTION OF THE DRAWINGS

The invention will now be explained more closely by the description of different embodiments of the invention and with reference to the appended figures.

FIG. 2 shows an example of a control device placed in front of a robot.

FIG. 3 shows the control device placed behind a robot.

FIG. 4 shows the control device placed on a first side of a robot.

FIG. 5 shows the control device placed on a second side of a robot.

DETAILED DESCRIPTION

Figure 1:
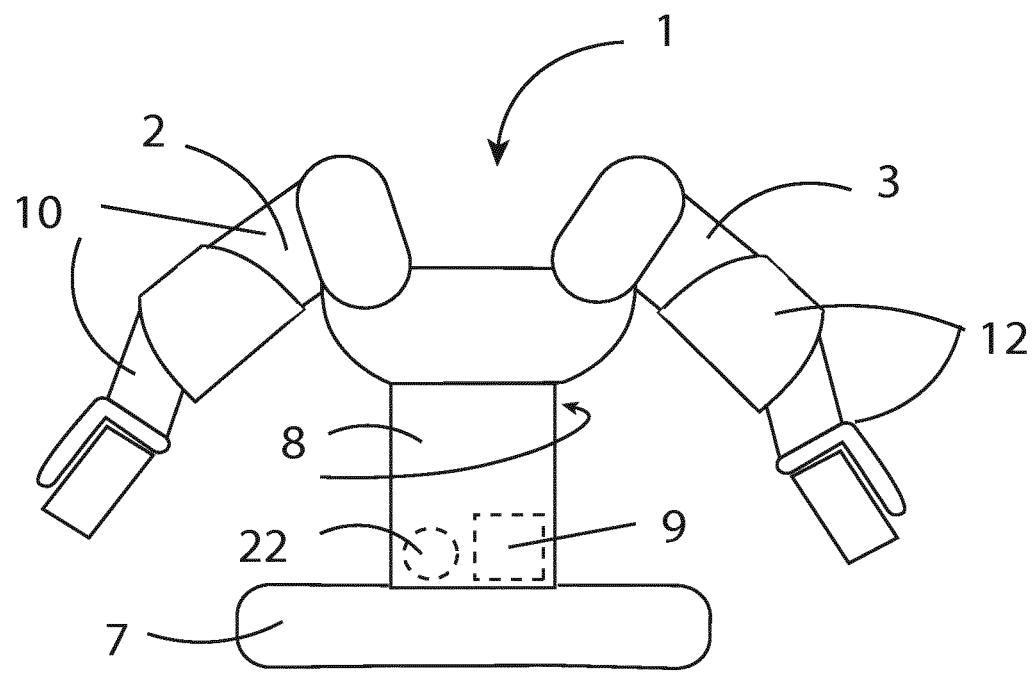
FIG. 1 shows an industrial robot system according to an embodiment of the invention.
Figure 1:
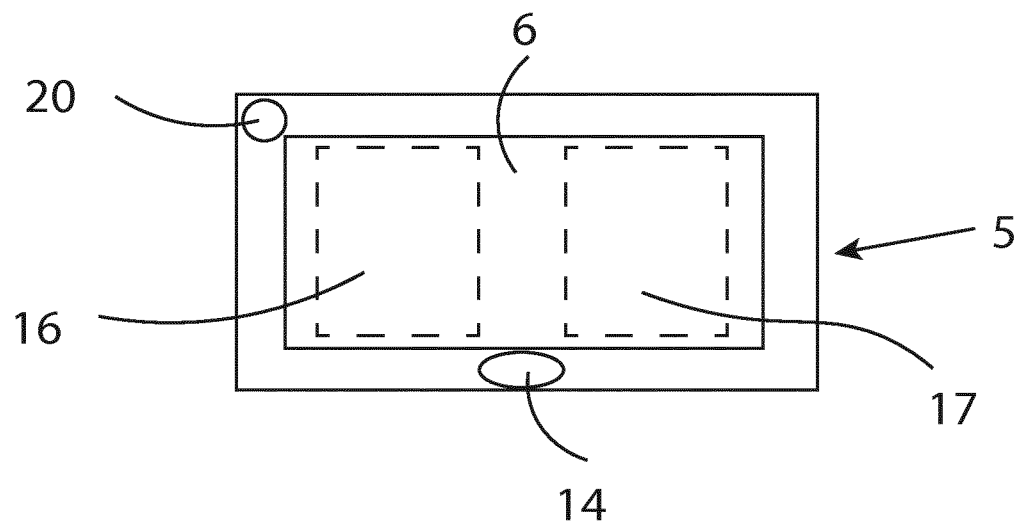

FIG. 1 shows an industrial robot system according to an embodiment of the invention. The robot system comprises a dual arm robot 1 having a first arm 2 and a second arm 3 independently movable in relation to each other. The robot 1 comprises base 7 and a body 8 arranged rotatable in relation to the base 7. The robot further comprises a control unit 9 configured to control the motions of the robot during operation of the robot. In this embodiment, the control unit 9 is integrated in the body 8 of the robot. The first and second arms 2, 3 are rotatably connected to the body 8 and comprise a plurality of arm parts 10 rotatably arranged in relation to each other about a plurality of joints 12.

The robot system further comprises a hand-held control device 5 for manually controlling and programming the robot. The control device 5 is provided with a visual display unit 6. The display unit 6 is, for example, a display screen or a touch screen. The control device 5 is configured to display information about the arms 2, 3 of the robot, such as swim lanes, on the display unit 6. The control device 5 is provided with user means for interacting with the control device, for example, a button 14. The control device 5 is, for example, a tablet computer, a smart phone, or any other portable computer device. The control device 5 is in communication with the control unit 9 of the robot. Suitably, the control device 5 and the control unit 9 have wireless communication with each other. A user, such as an integrator or robot operator, can access the functionality of the robot through the control device 5. The control device 5 is mobile, which enables the user to move around the robot 1 throughout the integration and programming process. Information on the current state of the robot as well as its workflow is displayed on the display unit 6. The control device is configured to display information about one of the arms in a first area 16 on the display unit 6, and to display information about the other arm in a second area 17 on the display unit. The control device 5 may comprise a processor unit, such as a central processing unit (CPU) and memory means, such as ROM and RAM.

According to the invention, the control device 5 is provided with a first measuring device 20 for measuring the orientation of the control device. In one embodiment of the invention, the first measuring device 20 comprises a magnetometer configured to measure the orientation of the control device 5 in relation to the earth magnetic field. In another embodiment of the invention, the first measuring device 20 comprises an accelerometer as well as a magnetometer, and the control device is configured to determine the orientation of the control device based on measurement from the magnetometer and the accelerometer. The control device 5 is then configured to compensate for variations in the angle of the control device in relation to the vertical line based on measuring data from the accelerometer. Thus, the control device is able to correctly determine its orientation also when the control device is tilted.

In another embodiment, the control device 5 can be provided with an Inertial Measuring Unit (IMU). An inertial measurement unit is an electronic device comprising an accelerometer, a gyroscope, and a magnetometer. There exist commercially available tablet computers having an integrated IMU. The first measuring device 20 can be an IMU integrated in the tablet computer. The IMU can be used for measuring the orientation of the control device 5.

The control device is configured to automatically present information related to the arms in a physically correct orientation in relation to the robot based on the current physical orientation of the control device in relation to the current physical orientation of the robot. The control device 5 is configured to change the positions of the first and second areas 16, 17 in dependence on the orientation of the control device 5 in relation to the robot 1 so that the positions of the first and second areas 16, 17 on the display unit 6 reflect the orientation of the control device in relation to the positions of the arms. The orientation of the control device 5 in relation to the robot 1 can be determined in many ways, for example, by carrying out a homing procedure. Homing can be done if the position of the robot is fixed. Homing could be a simple procedure where the user stands directly in front of the robot and confirms the orientation of the robot/control device.

In one embodiment of the invention, the robot is provided with a second measuring device 22, as disclosed in FIG. 1, for measuring the orientation of the robot. It is suitable to arrange the second measuring device 22 in the body 8 of the robot. However, it is also possible to arrange the second measuring device 22 in one of the arms 2, 3, although this will lead to more extensive calculations in order to determine the orientation of the robot. The robot 1 is configured to send information about its current orientation to the control device 5, for example, to send measuring data from the second measuring device 22 to the control device 5. The control device 5 is configured to calculate the difference between the measured orientation of the control device and the measured orientation of the robot 1, and to change the positions of the first and second areas 16, 17 in dependence on the calculated difference between the orientations of the control device 5 and the robot 1.

Preferably, the second measuring device 22 comprises a magnetometer configured to measure the orientation of the robot 1 in relation to the earth magnetic field. The robot 1 is configured to send measuring data from the magnetometer to the control device 5. Alternatively, the robot is configured to determine its current orientation based on measurements from the magnetometer and to send its current orientation to the control device 5. In another embodiment of the invention, the second measuring device 22 comprises an accelerometer, and the robot is configured to determine its orientation based on measurements from the magnetometer as well as from the accelerometer. The robot 1 is configured to compensate for variations in the angle of the robot in relation to the vertical line based on measuring data from the accelerometer. Thus, the control device is able to correctly determine its orientation also when the robot, due to its mounting, is not entirely aligned with the vertical line.

The control device 5 is configured to determine when it is in front of the robot and when it is behind the robot based on the difference between the orientation of the control device and the orientation of the robot. The control device 5 is configured to change the positions of the first and second areas in dependence on whether the control device is in front of the robot or behind the robot. The control device is configured to change the positions of the first and second areas so that information on the arm on a left side of the robot with respect to the control device is presented to the left of the information on the arm on the right side of the robot regardless of whether the control device is in front of the robot or behind the robot. This is illustrated in FIGS. 2 and 3.

FIG. 2 shows an example of a view displayed on the control device 5 when the control device is positioned in front of the robot 1 and is facing a front side of the robot. This means that the user is standing in front of the robot, since the user is carrying the control device 5. The difference between the orientations of the control device and the robot is about 180° in this position. The first arm 2 is now on a left side L of the robot and the second arm 3 is on a right side R of the robot, as seen from the user's point of view. A first swim lane 24, representing a work flow of the first arm 2, is displayed in the first area of the display unit 6 of the control device 5. A second swim lane 26, representing a work flow for the second arm 3, is displayed to the right of the first swim lane 24 in a second area of the display unit 6 of the control device 5. Thus, it becomes easy for the user to understand which swim lane belongs to which arm. The control device is configured to switch the positions of the swim lanes in dependence on whether the control device is in front of the robot or behind the robot.

FIG. 3 shows an example of a view displayed on the control device 5 when the control device is positioned behind the robot 1 and is facing a rear side of the robot. This means that the user is standing behind the robot. The orientations of the control device and the robot is about the same in this position, i. e., the difference between their orientations is about 0°. The first arm 2 is now on a right side of the robot and the second arm 3 is on a left side of the robot, as seen from the user's point of view. The second swim lane 26 representing the workflow for the second arm 3 is now displayed on a left side of the display unit and the first swim lane 24 representing the workflow for the first arm 2 is now displayed on a right side of the display unit 6. Thus, the first and second swim lanes 24, 26 have changed places when the user has moved the control device 5 to the rear side of the robot, which makes it easy for the user to understand which swim lane belongs to which arm.

In an alternative embodiment, the control device 5 is configured, in addition to determining when it is in front or behind the robot, to determine when the control device is on a first or a second side of the robot based on the difference between the orientation of the control device and the orientation of the robot. The control device is configured to change the positions of the first and second areas in dependence on whether the control device is in front of the robot, behind the robot, on a first side of the robot or on a second side of the robot. This is illustrated in FIGS. 4 and 5.

FIG. 4 shows an example of a view displayed on the control device 5 when the control device is positioned on a first side of the robot 1. The first arm 2 is now closer to the control device than the second arm 3, as seen from the user's point of view. The first swim lane 24 representing the first arm 2 is displayed above the second swim lane 26 representing the second arm 3 on the display unit 6. The control device 5 is configured to switch the positions of the swim lanes in dependence on whether the control device is positioned on the first or the second side of the robot.

FIG. 5 shows an example of a view displayed on the control device 5 when the control device is positioned on a second side of the robot 1 opposite the first side. The second arm 3 is now closer to the control device than the first arm 2, as seen from the user's point of view. The first swim lane 24 representing the first arm 2 is now displayed below the second swim lane 26 representing the second arm 3 on the display unit 6. Thus, the first and second swim lanes 24, 26 have changed places when the user has moved the control device 5 to the opposite side of the robot, which makes it easy for the user to understand which swim lane belongs to which arm.

The control device 5 can be provided with a software module for determining the positions of the first and second areas 16, 17.

Figure 6:
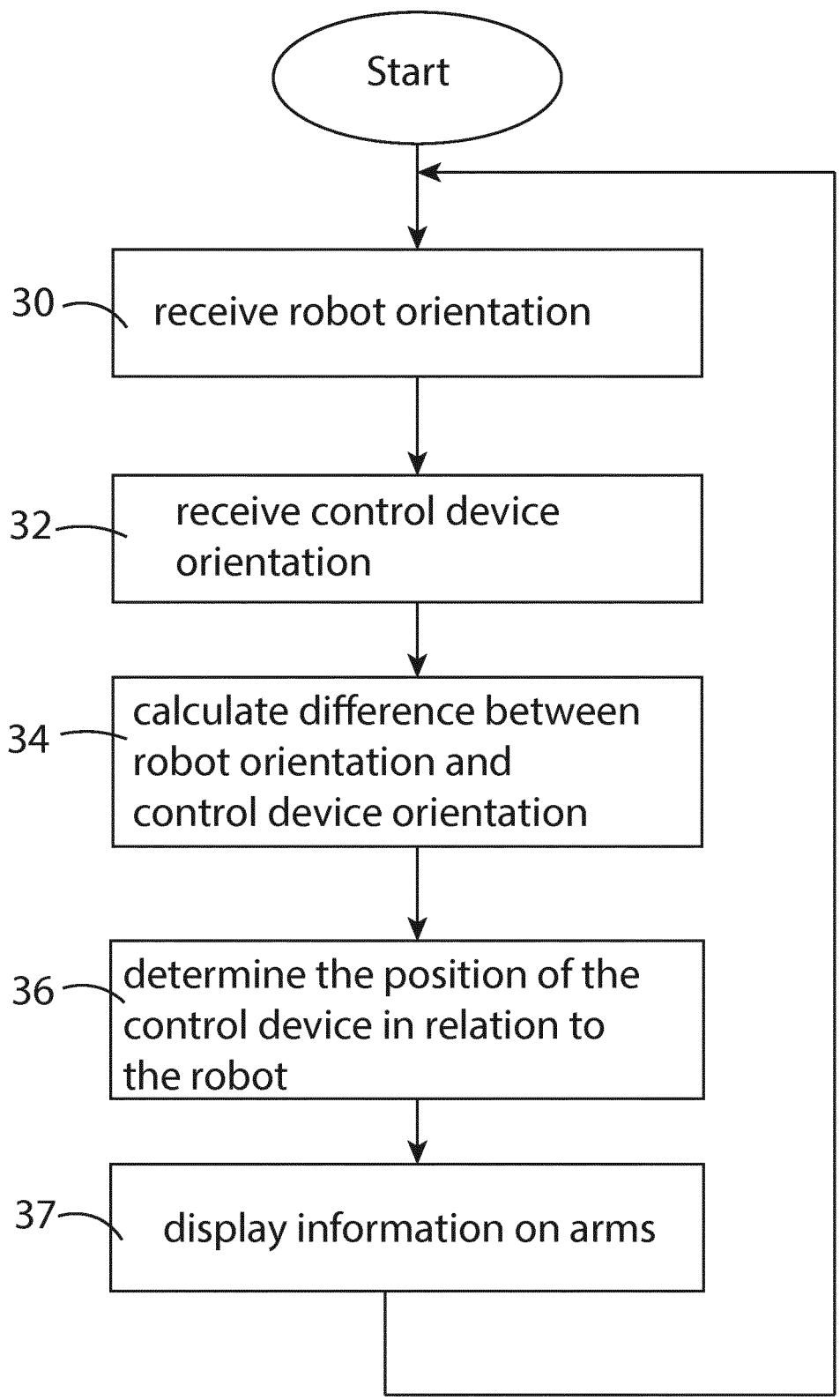
FIG. 6 shows a flow chart illustrating an example of an algorithm for determining where to display the information on the arms on a display unit.

FIG. 6 illustrates a flow chart of an example of an algorithm for determining where to display the information on the arms on the display unit 6. It will be understood that each block 30-37 of the flow chart can be implemented by computer program instructions. The control device 5 receives the orientation of the robot from the control unit 9, block 30. Measuring data representing the orientation of the control device 5 is received from the first measuring device 20, block 32. The difference between the orientation of the control device and the robot is calculated, block 34. The position of the control device 5 in relation to the robot 1 is determined based on the calculated difference in orientation, block 36. The position of the control device 5 in relation to the robot 1 can be any of "in front of the robot" and "behind the robot". This means that it is determined whether the control device is in front of the robot, or behind the robot. This can, for example, be done by determining whether the calculated difference of orientation AO is within defined intervals for behind and in front of the robot.

In an alternative embodiment of the invention, the position of the control device 5 in relation to the robot 1 can be any of "in front of the robot", "behind the robot", "a first side of the robot", and "a second side of the robot". This can mean that it is determined whether the control device is in front of the robot, behind the robot, on a first side, or on a second side of the robot. In an embodiment of the invention, this is done by determining whether the calculated difference of orientation AO is within defined intervals for the relative positions "in front of the robot", "behind the robot", "a first side of the robot", and "a second side of the robot".

For example, the control device is behind the robot if: $0°<\Delta O<45°$ or $315°<\Delta O<360°$ The control device is in front of the robot if: $135°<\Delta O<225°$ The control device is on a first side of the robot if: $45°<\Delta O<135°$ The control device is on a second side of the robot if: $225°<\Delta O<315°$ For each of the defined positions of the control device 5 in relation to the robot, there is a predetermined location specifying where the first and second area are to be displayed on the display unit 6, for example, as shown in FIGS. 2-5. The direction of the swim lanes can also be specified for each of the defined positions of the control device in relation to the robot. For example, the direction of the swim lanes are top-down for the relative positions "in front of the robot" and "behind the robot" as shown in FIGS. 2 and 3, and the direction of the swim lanes are from left to right for the relative positions "first side" and "second side" as shown in FIGS. 4 and 5.

In a next step, the information on the first and second arm, for example the swim lanes 24, 26, is displayed on the display unit in dependence on the determined position of the control device 5 in relation to the robot, block 37. Thus, if the relative position between the control device and the robot has been changed, the positions of the first and second areas are changed based on the new relative position between the control device and the robot. The steps 30-37 are repeated as long as the user commands the control device to display information about the two arms.

The present invention is not limited to the embodiments disclosed but may be varied and modified within the scope of the following claims. For example, other types of information about the arms can be displayed on the first and second area. The orientation of the robot can be measured by other methods and with other measuring devices.

The invention claimed is:

1. An industrial robot system comprising a dual arm robot having two arms independently movable in relation to each other, and a hand-held control device for controlling the robot and provided with a visual display unit for displaying information about the arms, wherein the control device is provided with a first measuring device for measuring the orientation of the control device, and the control device is configured to display information about one of the arms in a first area on the display unit and to display information about the other arm in a second area on the display unit, and to change the positions of the first and second areas in dependence on the orientation of the control device in relation to the robot so that the positions of the first and second areas on the display unit reflect the orientation of the control device in relation to the positions of the arms.

2. The robot system according to claim 1, wherein the control device is configured to determine when it is in front of the robot and when it is behind the robot based on the orientation of the control device in relation to the robot, and to change the positions of the first and second areas in dependence on whether the control device is in front of the robot or behind the robot so that information on the arm on a left side of the robot with respect to the control device is presented to the left of the information on the arm on the right side of the robot regardless of whether the control device is in front of the robot or behind the robot.

3. The robot system according to claim 2, wherein the control device is configured to determine when it is on a first side of the robot and when it is on a second side of the robot based on the orientation of the control device in relation to the robot, and to change the positions of the first and second areas in dependence on whether the control device is determined to be in front of the robot, behind the robot, on the first side of the robot, or on the second side of the robot.

4. The robot system according to claim 2, wherein said first measuring device includes a magnetometer.

5. The robot system according to claim 2, wherein the robot is provided with a second measuring device for measuring an orientation of the robot, and the control device is configured to change the positions of the first and second areas in dependence on the difference between the orientation of the control device and the orientation of the robot.

6. The robot system according to claim 2, wherein said information about the arms includes swim lanes representing work flows for each of the arms.

7. The robot system according to claim 1, wherein the control device is configured to calculate a difference between the orientations of the control device and the robot, and to determine whether the control device is in front of the robot or behind the robot based on the calculated difference between the orientations.

8. The robot system according to claim 1, wherein the control device is configured to determine when it is on a first side of the robot and when it is on a second side of the robot based on the orientation of the control device in relation to the robot, and to change the positions of the first and second areas in dependence on whether the control device is determined to be in front of the robot, behind the robot, on the first side of the robot, or on the second side of the robot.

9. The robot system according to claim 1, wherein said first measuring device includes a magnetometer.

10. The robot system according to claim 9, wherein said first measuring device includes an accelerometer, and the control device is configured to determine the orientation of the control device based on measurements from the magnetometer and the accelerometer.

11. The robot system according to claim 1, wherein the robot is provided with a second measuring devices for measuring an orientation of the robot, and the control device is configured to change the positions of the first and second areas in dependence on the difference between the orientation of the control device and the orientation of the robot.

12. The robot system according to claim 11, wherein said first measuring devices is configured to measure the orientation of the control device in relation to the earth magnetic field, and the second measuring device is configured to measure the orientation of the robot in relation to the earth magnetic field, and the control device is configured to calculate the difference between the orientation of the control device and the orientation of the robot, and to change the positions of first and second areas in dependence on the difference.

13. The robot system according to claim 12, wherein said second measuring device includes a magnetometer.

14. The robot system according to claim 12, wherein the robot has a body and the arms are movably connected to the body, and said second measuring device is mounted in the body.

15. The robot system according to claim 11, wherein said second measuring device includes a magnetometer.

16. The robot system according to claim 15, wherein said second measuring devices includes an accelerometer, and the robot is configured to determine the orientation of the robot based on measurements from the magnetometer and the accelerometer.

17. The robot system according to claim 11, wherein the robot has a body and the arms are movably connected to the body, and said second measuring device is mounted in the body.

18. The robot system according to claim 1, wherein said information about the arms includes swim lanes representing work flows for each of the arms.

19. The robot system according to claim 18, wherein the control device is configured to determine when it is in front of the robot and when it is behind the robot based on the orientation of the control device in relation to the robot, and to switch the positions of the swim lanes in dependence on whether the control device is in front of the robot or behind the robot.

20. The robot system according to claim 1, wherein said control device is a tablet computer.

* * * * *